United States Patent
Shinogi et al.

(10) Patent No.: US 7,458,255 B2
(45) Date of Patent: Dec. 2, 2008

(54) INDUSTRIAL ENGINE COMPLETION INSPECTION METHOD

(75) Inventors: Yoshihisa Shinogi, Wako (JP); Tomoki Fukushima, Wako (JP); Akihisa Shinoda, Wako (JP)

(73) Assignee: Honda Motor Co., Ltd. (JP)

( * ) Notice: Subject to any disclaimer, the term of this patent is extended or adjusted under 35 U.S.C. 154(b) by 358 days.

(21) Appl. No.: 11/448,694

(22) Filed: Jun. 7, 2006

(65) Prior Publication Data

US 2007/0000314 A1    Jan. 4, 2007

(30) Foreign Application Priority Data

Jun. 23, 2005    (JP) ............... 2005-182988

(51) Int. Cl.
*G01M 15/00* (2006.01)

(52) U.S. Cl. ............... 73/114.01; 73/114.13

(58) Field of Classification Search ......... 73/114.01, 73/114.02, 114.13, 114.14, 114.15, 114.16, 73/114.25
See application file for complete search history.

(56) References Cited

U.S. PATENT DOCUMENTS

| | | | | |
|---|---|---|---|---|
| 4,375,672 A | * | 3/1983 | Kato et al. | 701/102 |
| 6,067,498 A | * | 5/2000 | Akiyama | 701/110 |
| 6,836,539 B2 | * | 12/2004 | Katou et al. | 379/106.01 |
| 2003/0028296 A1 | * | 2/2003 | Miller | 701/29 |
| 2004/0255702 A1 | * | 12/2004 | King et al. | 73/865.8 |

FOREIGN PATENT DOCUMENTS

| | | |
|---|---|---|
| JP | 01349806 | 12/2001 |
| JP | 03228409 | 8/2003 |

* cited by examiner

*Primary Examiner*—Eric S McCall
(74) *Attorney, Agent, or Firm*—Adams & Wilks

(57) ABSTRACT

An inspection method is conducted after the assembly of an industrial engine is complete. An identification code assigned to an industrial engine is read. Basic engine specification data and device-specific engine specification data that correspond to the read identification code are extracted from a database to a completion inspection unit. Various inspections are conducted on the individual engine by the completion inspection unit on the basis of the extracted basic engine specification data. The device-specific engine specification data of the engine that has passed the inspection is written into memory. A confirmation inspection is then conducted by a device-specific inspection machine to determine whether the engine has the output characteristics required by the mounting device.

4 Claims, 6 Drawing Sheets

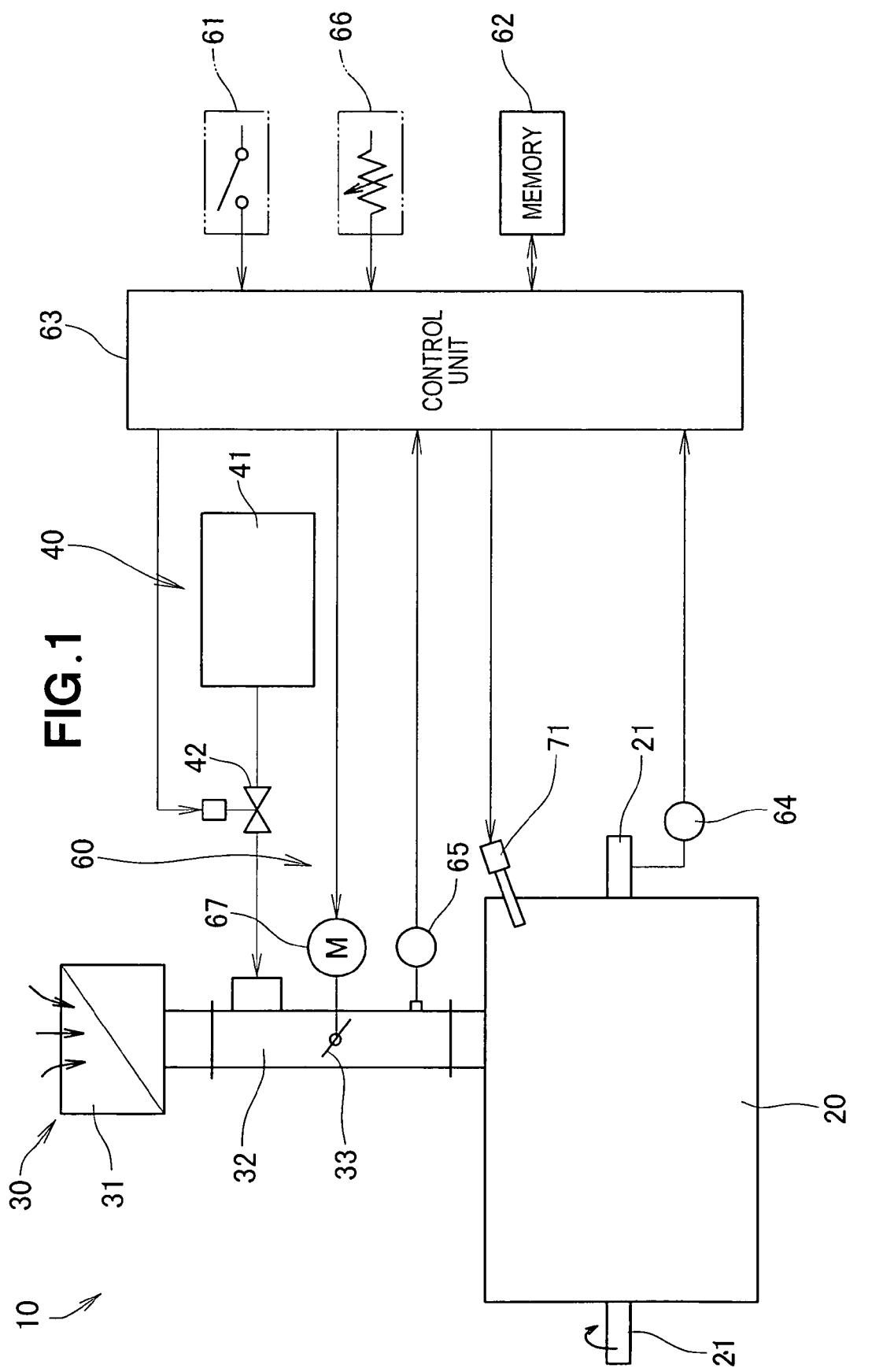

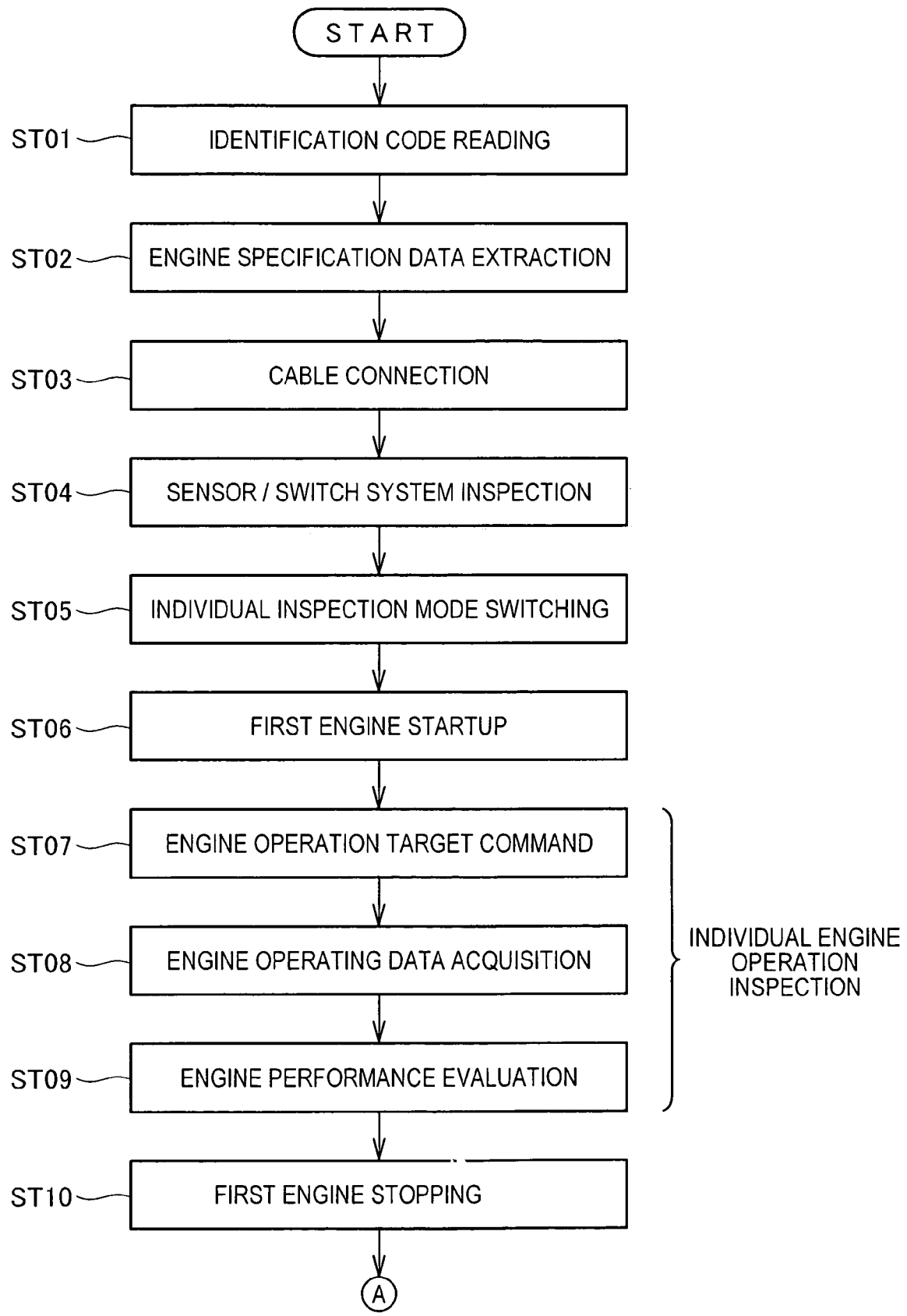

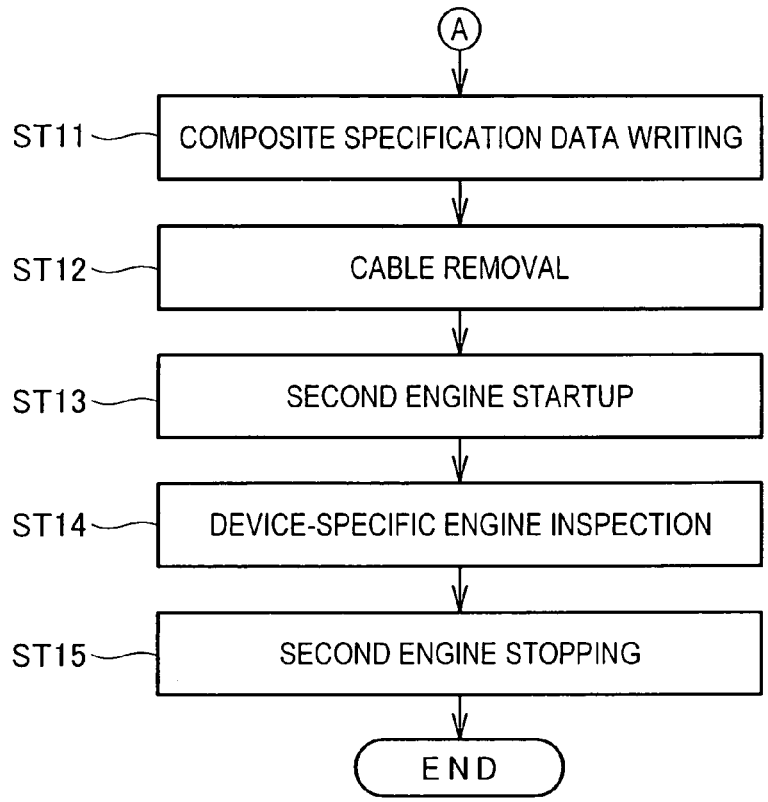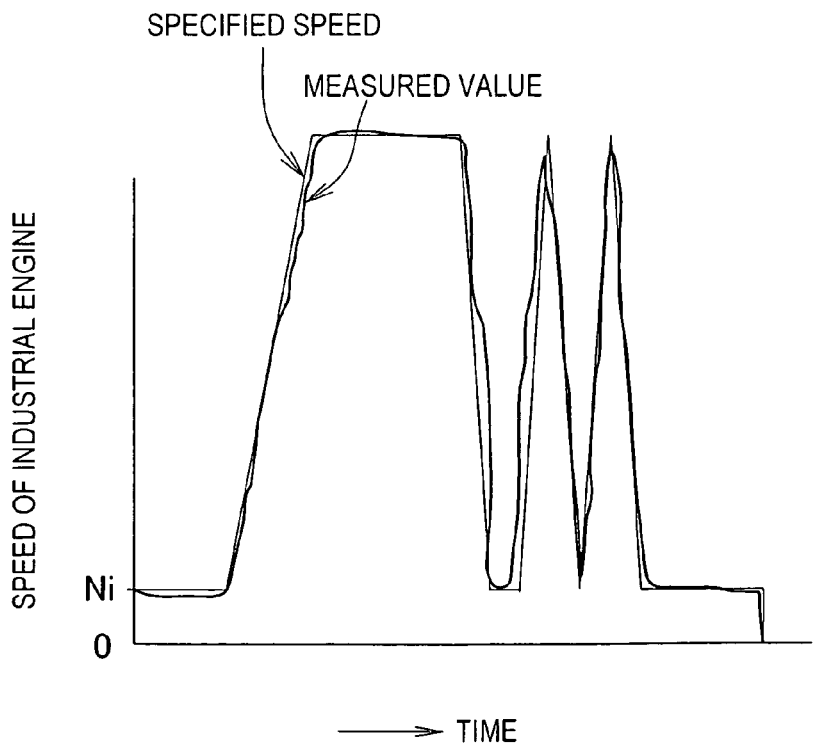

INDUSTRIAL ENGINE COMPLETION INSPECTION METHOD

FIELD OF THE INVENTION

The present invention relates a completion inspection method that is performed in the final stage after the assembly of an industrial engine is complete.

BACKGROUND OF THE INVENTION

The basic output characteristics, external appearance, dimensions, and other such features of an engine are generally ensured by performing various inspections in each step before assembly, during assembly, and after completion. Examples of methods of inspection during the assembly of an engine are disclosed in JP-2001-349806A and JP-2003-228409A.

In the industrial engine completion inspection method disclosed in JP-2001-349806A, during the assembly of the engine, a conveying platform on which a crankcase is mounted is moved from the assembly line to an inspecting location and the crankcase is inspected, and then the conveying platform on which the crankcase is mounted is returned back to the assembly line.

In the industrial engine completion inspection method disclosed in JP-2003-228409A, historical problem data during production that are found by the inspection during the assembly of the engine is stored in a database according to the engine number, and in the subsequent sampling inspection step, the occurrence of problem historical data is searched for by using the engine number as a search key, and an additional inspection is performed if problem historical data is found.

Since an industrial engine among engines is the power source mounted in operating machines and various other devices, the output characteristics of such an engine must conform to the characteristics required by each of these devices.

In general inspection methods, in addition to inspecting the basic output characteristics of the individual industrial engines when the completion of the industrial engine is inspected, the inspector also makes adjustments so that the output characteristics required by the device mounted with the industrial engine are achieved, and confirms the results of these adjustments. Furthermore, operating noise, noise signals, and other conditions developed by the industrial engine are determined by the inspector via a sensory inspection.

However, there is a limit to increasing the precision of the inspection results, because an inspection method that requires manual operations by the inspector is subject to individual differences, and nonuniformities can occur in the inspection results. Moreover, man-hours increase with manual operations, causing the inspection costs to increase.

In view of this, there is a need for techniques whereby the precision of the inspection results is improved and the inspection costs can be reduced in industrial engine completion inspection methods.

SUMMARY OF THE INVENTION

According to the present invention, there is provided an industrial engine completion inspection method for inspecting whether an assembled industrial engine exhibits a specific performance, the method comprising the steps of: reading a manufacturing number or another such identification code assigned to the industrial engine; extracting basic engine specification data for the individual industrial engine, as well as device-specific engine specification data based on the operating machine or other device on which the industrial engine is mounted, from a database to a completion inspection unit on the basis of the read identification code; connecting the completion inspection unit to the industrial engine with the aid of a communication cable; switching the operating mode of a control unit of the industrial engine to an inspection mode based on the basic engine specification data; starting up the industrial engine; conducting various inspections on the individual industrial engines on the basis of the basic engine specification data; temporarily stopping the industrial engine after the inspection process is complete; writing the device-specific engine specification data into memory in the control unit from the completion inspection unit; removing the communication cable from the industrial engine; restarting the industrial engine; inspecting, on the basis of the device-specific engine specification data written into the memory, the operation confirmation of the industrial engine when there is a correspondence with the devices; and stopping the industrial engine after the inspection of the operation confirmation is complete.

Thus, in the industrial engine completion inspection method of the present invention, the identification code individually assigned to each industrial engine is read, (1) basic engine specification data of the industrial engine to be inspected and (2) the device-specific engine specification data based on the device on which the industrial engine is mounted are automatically extracted from a database to the completion inspection unit using the identification code as a search key, and various inspections are then automatically conducted on each of the industrial engines on the basis of the basic engine specification data extracted to the completion inspection unit, while the completion inspection unit and the control unit of the industrial engine are connected.

The term "basic engine specification data" used herein refers to data (including various parameters) regarding the basic output characteristics of an individual industrial engine as such, i.e., the basic performance. The term "device-specific engine specification data" refers to data (including various parameters) regarding the characteristics required by a mounting device. These items of data are set in advance and can be used as fixed inspection conditions.

Conducting this series of inspection procedures makes it possible to automatically inspect the basic performance of an individual industrial engine on the basis of fixed inspection conditions, which constitute the basic engine specification data, while the completion inspection unit and the control unit of the industrial engine are connected. Therefore, the precision of the inspection results of each individual industrial engine can be improved.

With an industrial engine that has passed the individual engine inspection, the device-specific engine specification data is written into memory from the completion inspection unit, and the industrial engine is then subjected to a confirmation inspection to determine whether the engine has the output characteristics required by the mounting device.

An industrial engine in which the device-specific engine specification data has been written into memory is self-controlled so as to achieve the output characteristics required by the mounting device. Therefore, there is no need for the inspector to make adjustments so that the output characteristics required by the mounting device are achieved. Furthermore, the confirmation inspection can be conducted by either the completion inspection unit or a separate inspection device.

Thus, the performance of a series of procedures involving a confirmation inspection and the writing of device-specific engine specification data makes it possible to set the industrial engine to the device-specific engine specifications, to efficiently conduct the confirmation inspection, and to improve the precision of the inspection results.

Thus, in the industrial engine completion inspection method of the present invention, the precision of the inspection results can be improved, the inspection can be conducted quickly, and inspection costs can be reduced.

Moreover, there is no need to prepare the control unit or the memory in advance in accordance with each device for an industrial engine that has passed the individual engine inspection, because the device-specific engine specification data is written from the completion inspection unit into the memory of the industrial engine. Therefore, since only one type each of control unit and memory needs to be prepared, manufacturing costs and storage costs can be lowered and storage space can be reduced.

Furthermore, the steps of conducting various inspections on each industrial engine preferably include operating the industrial engine via the control unit in accordance with a specific operation target by sending an engine operation target command signal based on the basic engine specification data from the completion inspection unit to the control unit, sending the operating data obtained as a result of operating the industrial engine in accordance with the operation target from the control unit to the completion inspection unit, and evaluating the performance of the industrial engine by comparing the operating data with the operation target. Therefore, the performance of the individual engine can be more reliably and accurately inspected.

Additionally, it is preferable that the sensors and switch systems of the industrial engine be inspected following the step of connecting the completion inspection unit and the industrial engine. Thus, inspecting the sensors and the switch systems of the industrial engine in advance makes it possible to smoothly and reliably inspect the operation of the individual industrial engine.

Furthermore, it is preferable that the identification code be composed of a barcode, and the barcode be read by a barcode reader or other optical reading means when the identification code is read. Therefore, information pertaining to the industrial engine to be inspected can be extracted in an extremely quick and reliably manner.

BRIEF DESCRIPTION OF THE DRAWINGS

A preferred embodiment of the present invention will be described in detail below, by way of example only, with reference to the accompanying drawings, in which:

FIG. 1 is a system diagram of the combustion system of an industrial engine according to the present invention;

FIGS. 5 and 6 are flowcharts illustrating the industrial engine completion inspection method according to the present invention; and FIG. 7 is an explanatory view illustrating the general concept of the individual engine operation inspection process according to the present invention.

DETAILED DESCRIPTION OF THE PREFERRED EMBODIMENTS

Figure 2A:
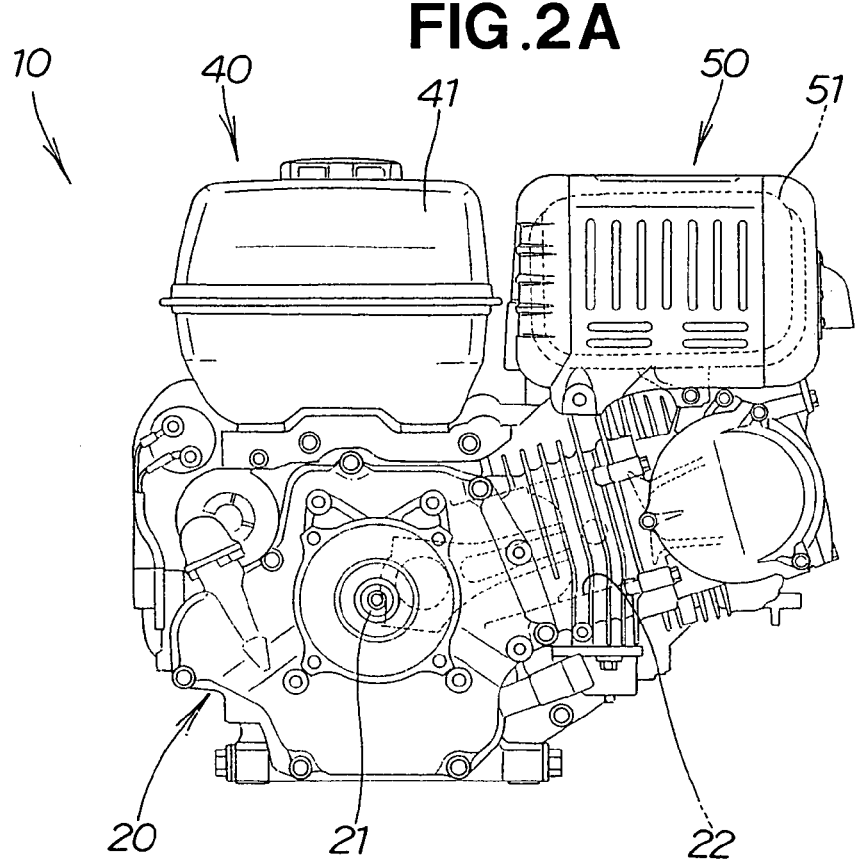
FIGS. 2A and 2B are schematic views illustrating the general arrangement of the industrial engine of FIG. 1.
Figure 2B:
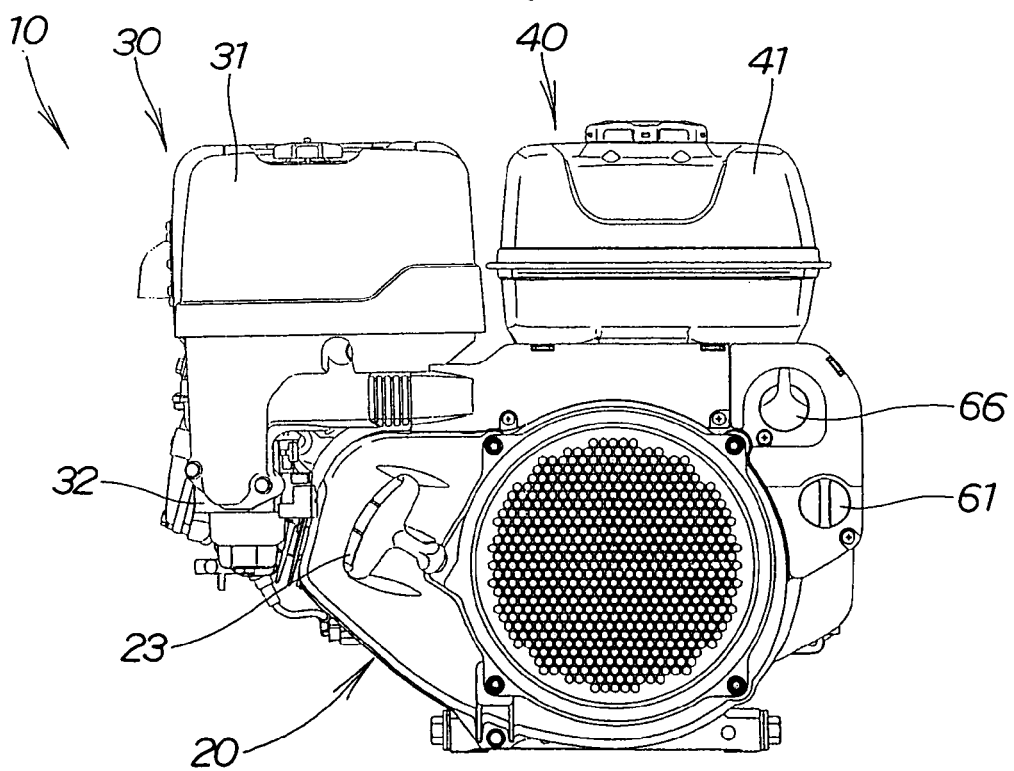

As shown in FIGS. 1, 2A, and 2B, the industrial engine 10 is an engine unit that integrally incorporates a combustion air supply system 30, a fuel supply system 40, an exhaust system 50 (see FIG. 2A), a power generator (not shown), and the like within an engine main body 20. The engine main body 20 is an inclined cylinder-type of OHC air-cooled single-cylinder internal-combustion engine.

As shown in FIG. 2A, when the engine main body 20 is viewed from the power output side of a crankshaft 21 (in other words, when it is viewed from the front), a cylinder 22 is disposed at an incline in relation to the substantially horizontal crankshaft 21. The exhaust system 50 has an exhaust muffler 51.

A manual startup system with a recoil starter or an automatic startup system with a starter motor can be appropriately used for the startup system of the industrial engine 10. The industrial engine 10 of the present invention has a power self-generating function. Therefore, a battery may not be necessary when a manual startup system is used. If an automatic startup system is used, a battery should be incorporated into the industrial engine 10.

FIGS. 2A and 2B show an industrial engine 10 that has a manual startup system with a recoil starter. As shown in FIG. 2B, when the industrial engine 10 is viewed from behind, the industrial engine 10 can be seen to have a recoil starter startup grip 23.

As shown in FIG. 1, the combustion air supply system 30 is configured so that combustion air that is led in through an air cleaner 31 is supplied to the engine main body 20 via a carburetor 32, and the carburetor 32 includes a throttle valve 33.

The fuel supply system 40 is configured so that fuel supplied from a fuel tank 41 to the carburetor 32 is taken into the carburetor 32 with the aid of the negative pressure of engine intake. The fuel supplied to the carburetor 32 is sprayed and mixed with the combustion air, and this mixture enters in through an engine intake port. A fuel shut-off valve 42 is provided to the fuel supply system 40, whereby the fuel shut-off valve 42 can be closed to shut off the supply of fuel when the engine main body 20 is stopped with a main switch 61 (an ignition switch or another such power source switch 61).

The opening and closing of the throttle valve 33 is controlled by an electronic governor 60 (also referred to as an electric governor 60). In other words, the electronic governor 60 is configured to control the degree of opening of the throttle valve 33 by means of the control unit 63 so that the actual engine speed, i.e., the actual rotation speed of the crankshaft 21, reaches the objective engine speed that is based on the engine specification data stored in the memory 62.

More specifically, the control unit 63 controls the rotation of a control motor 67 on the basis of the engine speed determined by an engine rotation sensor 64, the degree of opening of the throttle valve 33 determined by a throttle position sensor 65, and the set value of a manually adjusted governor characteristic adjustment means 66 when the main switch 61 is set to on. The control motor 67 is a throttle motor that adjusts the degree of opening by receiving a control signal from the control unit 63 and driving the throttle valve 33 to open and close, and is composed, for example, of a direct current motor that is operated by a PWM signal from the control unit 63.

The actual engine speed can be brought to the engine objective speed by varying the amounts of combustion air and fuel supplied according to the degree of opening of the throttle valve 33.

The industrial engine 10 has the main switch 61, the control unit 63, the memory 62 incorporated into the control unit 63, and the governor characteristic adjustment means 66.

The memory 62 is configured to be capable of writing engine specification data via external communication means, and is composed of RAM (random access memory), for example.

The governor characteristic adjustment means 66 finely adjusts the engine output characteristics (rotation characteristics) as needed based on the engine specification data stored in the memory 62, and is composed of a volume, for example.

A mechanical system such as a centrifugal governor mechanism has been used for the governor in conventional industrial engines. Therefore, it has been necessary for an operator to individually adjust the governor characteristics of each industrial engine, i.e., the engine output characteristics, before shipping a multitude of industrial engines from the factory site. Moreover, the governor characteristics differ for each type of device on which the industrial engines are mounted. Therefore, an operator has had to individually adjust the characteristics so the governor characteristics are different for each type of device.

In contrast, since the industrial engine 10 of the present invention employs a mode setting system for the engine speed that relies on an electronic governor 60, there is no need for an operator to make separate adjustments before the industrial engine is shipped from the factory site. Therefore, the man-hours for adjustments can be reduced. Moreover, the engine output characteristics can be set with extreme precision because the degree of opening of the throttle valve 33 can be controlled all at once by the control unit 63.

Furthermore, the control unit 63 operates the engine main body 20 by sending an ignition command to an engine ignition device 71. Examples of other sensors of the industrial engine 10 not shown in the diagrams include temperature sensors (detection sensors for lubricating oil, air intake temperature, exhaust temperature, engine wall temperature, and the like), a level sensor for the engine lubrication oil, and the like.

Figure 3:
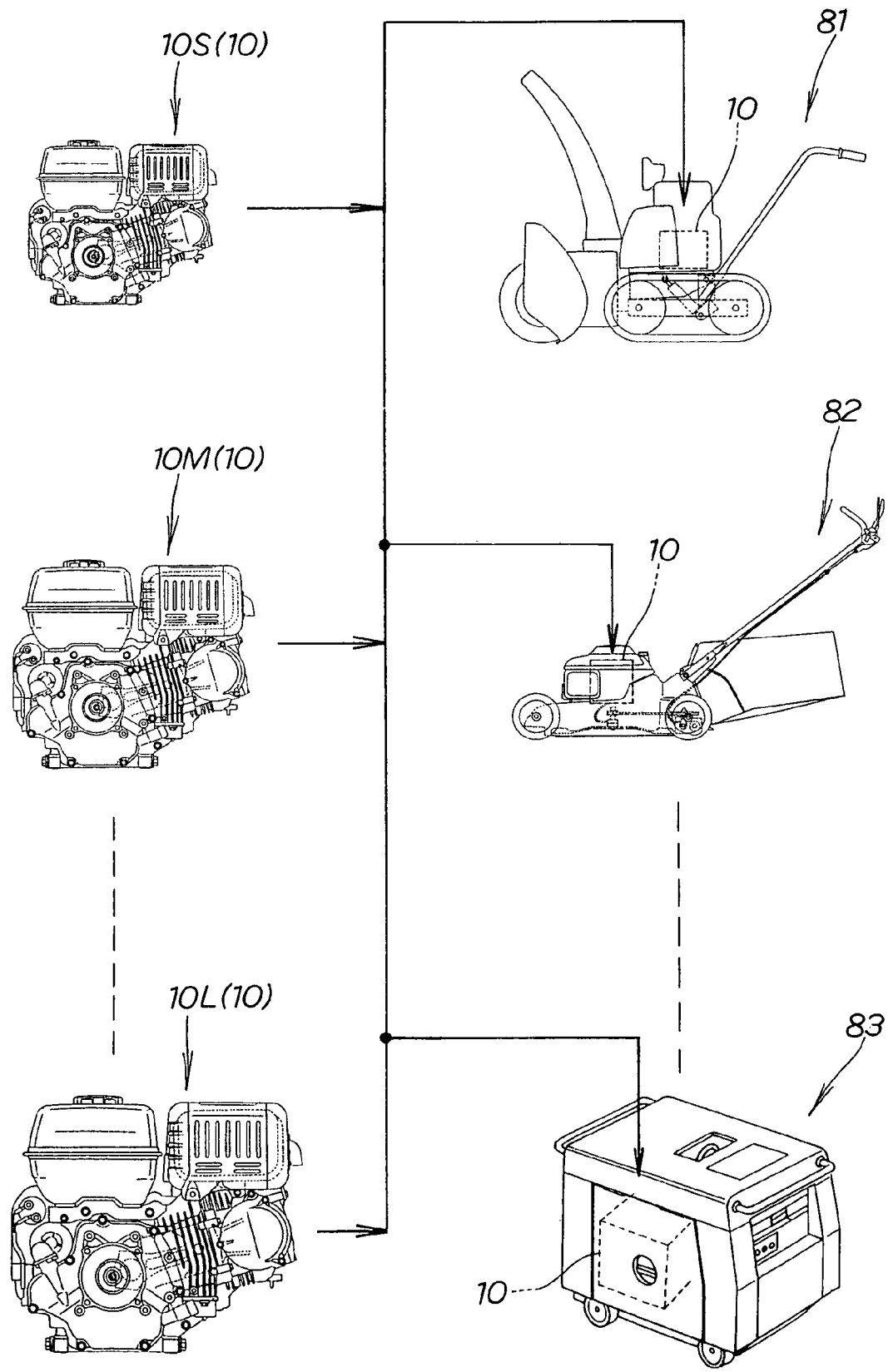
FIG. 3 is an explanatory view illustrating a relationship between the industrial engine of FIGS. 2A and 2B and a device on which the industrial engine is mounted.

As shown in FIG. 3, the industrial engine 10 . . . of the present invention can be any of a plurality of types, from small low-output engines to large high-output engines. FIG. 3 shows only three types of industrial engines 10 . . . , and for the sake of convenience, the small industrial engine 10 is particularly referred to as a small engine 10S, the midsize industrial engine 10 is particularly referred to as a midsize engine 10M, and the large industrial engine 10 is particularly referred to as a large engine 10L.

The industrial engine 10 . . . is a variably-inclining engine that is capable of having the mounting positions thereof freely inclined within a 360° range in accordance with the device on which it is mounted. Therefore, the industrial engine 10 . . . can be mounted on any type of device. For example, the industrial engine 10S, 10M, 10L, . . . can be mounted on a snow blower 81, a lawn mower 82, a power generator 83, a transportation vehicle (not shown), or any of various other types of operating machines. The industrial engine 10S, 10M, 10L, . . . that has the engine output characteristics (corresponding to the characteristics of the operating machine 81, 82, 83, . . . ) required by the operating machine 81, 82, 83, . . . can be appropriately selected and mounted.

Next, the completion inspection apparatus and the completion inspection method for the industrial engine 10 thus configured will be described with reference to FIGS. 4 through 7. The industrial engine completion inspection apparatus and the industrial engine completion inspection method are designed to determine whether the assembled industrial engine 10 exhibits a specific performance.

Figure 4:
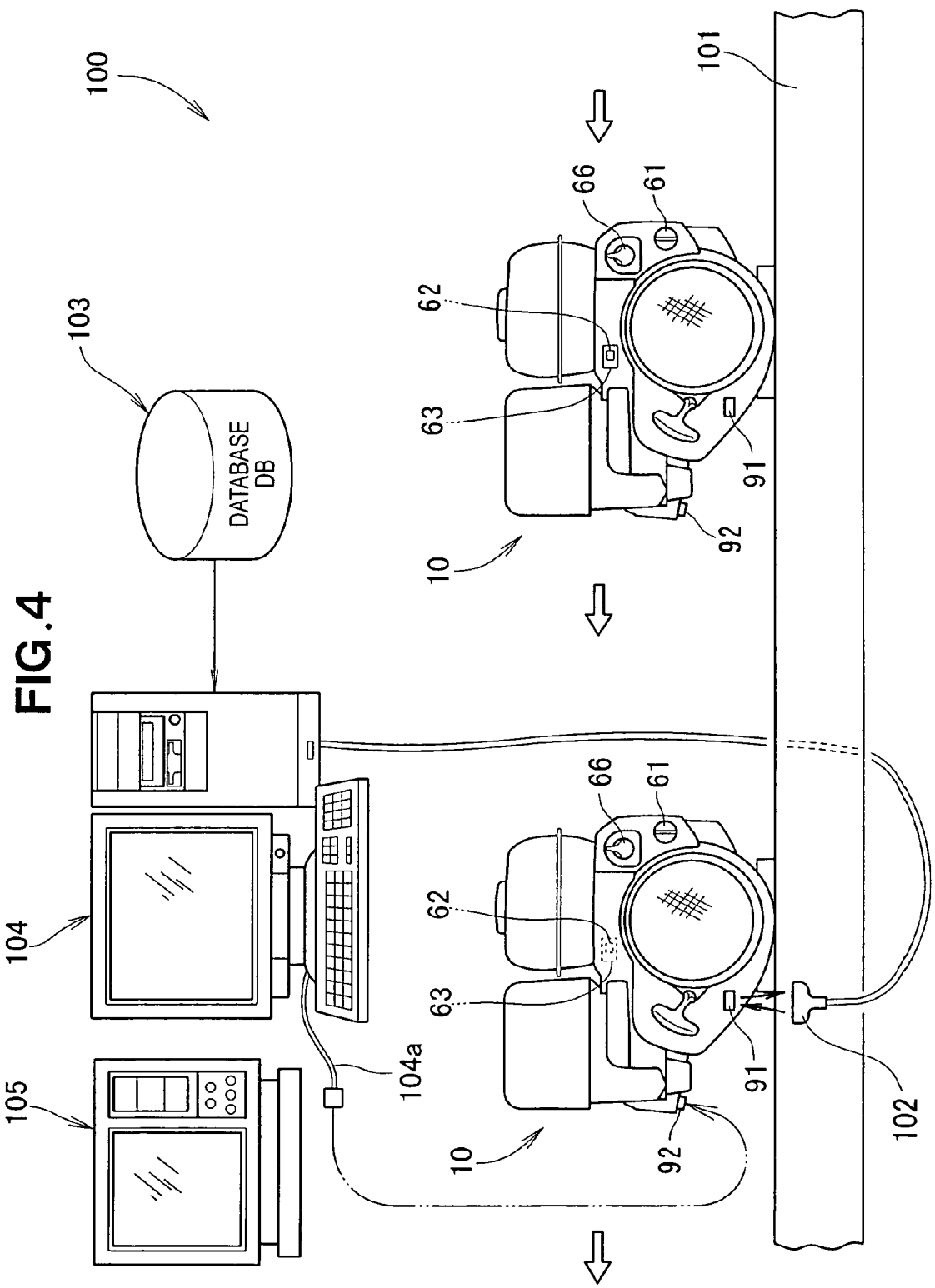
FIG. 4 is a schematic view of an industrial engine completion inspection apparatus according to the present invention.

As shown in FIG. 4, an industrial engine completion inspection apparatus 100 has, as its primary structural components, a conveyor 101, an identification code reader device 102, a server 103, a completion inspection unit 104, and a device-specific inspection device 105.

The conveyor 101 is a device for sequentially conveying a plurality of industrial engines 10 . . . composed of assembled and completed products to an inspection location shown in FIG. 4, and for conveying the engines out from the inspection location after the inspection is complete.

The identification code reader device 102 is a means for reading the identification codes 91 . . . , such as a serial number of manufacture, assigned to the industrial engines 10 . . . . The reader device is composed of a barcode reader (barcode reader) or other such optical reading means, for example. The identification codes 91 . . . are product identification symbols (identification information) assigned to each individual industrial engine 10 . . . , and these codes are composed of barcodes written onto tags, for example. The identification code 91 carries the product number for an industrial engine 10, the type of device on which the industrial engine 10 is mounted, a shipping address, and other such various information.

The server 103 stores a database DB. The database DB is a compilation of the identification codes 91 . . . of the industrial engines 10 . . . , as well as the basic engine specification data and device-specific engine specification data that correspond to the individual identification codes 91 . . . . The database is stored in an electronic format according to specific rules.

The basic engine specification data is data on an individual industrial engine 10 . . . , i.e., data that is specific to the industrial engine 10 . . . unrelated to devices. More specifically, the basic engine specification data is data on the basic output characteristics (including various parameters) of the individual industrial engine 10 itself, i.e., basic property data, and includes the minimum engine speed, the maximum engine speed, acceleration and deceleration characteristics, output in relation to speed, and various other data.

The device-specific engine specification data is data based on the operating machine or other device on which the industrial engine 10 . . . is mounted. More specifically, the device-specific engine specification data is data (including various parameters) related to the characteristics required by the mounting device. This data includes, for example, the governor characteristics (governor modes) of the electronic governor 60 shown in FIG. 1, an oil alert mode based on the engine lubrication oil level (for example, a reference value for the lubrication oil level that differs depending on the position of the industrial engine 10 mounted on the device, the conditions of use, and the like), the set speed of the engine, and various other data.

The term "engine specification data" refers collectively to the basic engine specification data and the device-specific engine specification data.

A conceptual example of the database DB is depicted in the following table.

TABLE

| Mmfg. no. of ind. engine | Type of mounting device | | | |
| --- | --- | --- | --- | --- |
| | M1 | M2 | M3 | ... |
| E1 | De1 | De1 | De1 | ... |
| | Dm11 | Dm12 | Dm13 | |
| E2 | De2 | De2 | De2 | ... |
| | Dm21 | Dm22 | Dm23 | |
| E3 | De3 | De3 | De3 | ... |
| | Dm31 | Dm32 | Dm33 | |
| ... | ... | ... | ... | ... |

Basic engine specification data: De1, De2, ...
Device-specific engine specification data: Dm11, Dm12, Dm21, ...

As shown in the table and in FIG. 4, the plurality of identification codes 91 . . . contain information that includes the manufacturing numbers E1, E2, E3, . . . of the plurality of industrial engines 10 . . . , and the types (types of mounting devices) of devices M1, M2, M3, . . . on which the plurality of industrial engines 10 . . . are mounted.

The database DB is an information system in which the basic engine specification data De1, De2, . . . that corresponds to the manufacturing number of the industrial engine 10 and the type of mounting device, as well as the device-specific engine specification data Dm11, Dm12, . . . , are mapped out as shown in this table, for example.

The basic engine specification data is always the same if the manufacturing number of the industrial engine 10 is the same, regardless of the type of mounting device. For example, if the manufacturing number of the industrial engine 10 is E1, the basic engine specification data will always be De1.

The device-specific engine specification data differs depending on the combination of the manufacturing number of the industrial engine 10 and the type of mounting device. For example, the device-specific engine specification data is Dm11 for a combination of E1 and M1, and the device-specific engine specification data is Dm32 for a combination of E3 and M2.

As shown in FIG. 4, the completion inspection unit 104 (i) extracts corresponding basic engine specification data and device-specific engine specification data from the database DB in the server 103 on the basis of the identification code 91 read by the identification code reader device 102, (ii) conducts various inspections on the individual industrial engines 10 on the basis of the basic engine specification data, and (iii) writes the device-specific engine specification data into the memory 62.

As shown in FIG. 4, the device-specific inspection device 105 conducts an operation confirmation inspection on the industrial engine 10 that corresponds to the device (namely, any of the operating devices 81, 82, 83, . . . shown in FIG. 3) on the basis of the device-specific engine specification data written into the memory 62.

The industrial engine completion inspection method that uses the industrial engine completion inspection apparatus 100 is as described below. The steps of the industrial engine completion inspection method are described on the basis of FIGS. 5 through 7, with reference to FIG. 4 and to the table.

ST01: The identification code 91 assigned to the industrial engine 10 to be inspected is read by the identification code reader device 102 (identification code reading step). In the information contained in the read identification code 91, the type of mounting device is M1 when the manufacturing number of the industrial engine is E1. As shown in the table, in the case of a combination of E1 and M1, the basic engine specification data is De1, and the device-specific engine specification data is Dm11.

Thus, the identification code 91 is configured with a barcode. In the identification code reading step ST01, the barcode is read by a barcode reader or other optical reading means 102. Instead of the code being read by the identification code reader device 102 in the identification code reading step ST01, another possibility is for the identification code 91 to be directly inputted by a manual operation, such as an inspection operator using a keyboard or other technique.

ST02: Next, a command is sent from the completion inspection unit 104 to the server 103, whereby the basic engine specification data De1 and the device-specific engine specification data Dm11 are retrieved from the database DB by using the read identification code 91 as a search key. The basic engine specification data De1 and the device-specific engine specification data Dm11 are then automatically extracted from the database DB to the completion inspection unit 104 on the basis of the read identification code 91 (engine specification data extraction step).

ST03: Next, a connection terminal 92 of the industrial engine 10 is connected to the completion inspection unit 104 with the aid of a communication cable 104a (cable connection step). This cable connection step ST03 is executed either by the inspecting operator or automatically.

ST04: Next, the sensors and the switch systems of the industrial engine 10 are automatically inspected by the completion inspection unit 104 (sensor/switch system inspection step). The sensors of the industrial engine 10 include, for example, the engine rotation sensor 64, the throttle position sensor 65, the temperature sensor, the engine lubrication oil level sensor, and the like. The switch systems of the industrial engine 10 include, for example, the main switch 61 system and other systems.

ST05: In an industrial engine 10 that has passed in the sensor/switch system inspection step ST04, the operating mode of the control unit 63 of the industrial engine 10 is automatically switched to an inspection mode based on the basic engine specification data De1 by the completion inspection unit 104 (individual inspection mode switching step). In other words, the individual inspection mode switching step ST05 is executed following the cable connection step ST03 and the sensor/switch system inspection step ST04. In this stage, there is no data stored in the memory 62.

ST06: The industrial engine 10 is started up (first engine startup step) following the individual inspection mode switching step ST05. This first engine startup step ST06 is executed either by the inspecting operator or automatically.

ST07: Next, an engine operation target command signal based on the basic engine specification data De1 is sent from the completion inspection unit 104 to the control unit 63, whereby the industrial engine 10 is operated according to a specific operation target by the control unit 63 (engine operation target command step). In other words, the control unit 63 controls the operation of the industrial engine 10 on the basis of a specific value (for example, specified engine speed) that corresponds to the basic engine specification data De1.

ST08: As a result of operating the industrial engine 10 on the basis of specific operation targets, the obtained operating data is sent from the control unit 63 to the completion inspection unit 104 (engine operating data acquisition step).

ST09: The operating data pertaining to the engine operation target command is compared by the completion inspection unit 104 and the performance is evaluated (engine performance evaluation step). For example, when the operation target is the engine speed, the operating data is the measured engine speed and the degree of opening of the throttle valve. As shown in FIG. 1, the measured engine speed can be detected by the engine rotation sensor 64, and the measured degree of opening of the throttle valve 33 can be detected by the throttle position sensor 65.

Thus, the combination of steps from ST07 to ST09 constitute individual engine operation inspection steps in which various inspections are automatically conducted on the individual industrial engines 10 by the completion inspection unit 104 on the basis of the basic engine specification data De1 following the first engine startup step ST06.

As a result of the individual engine operation inspection steps ST07 through ST09, performance of an individual engine can be more reliably and accurately inspected because performance is evaluated by operating the industrial engine 10 on the basis of the engine operation target command signal sent from the completion inspection unit 104 to the control unit 63, sending the resulting operating data from the control unit 63 to the completion inspection unit 104, and comparing the operating data pertaining to the engine operation target command.

A conceptual example of the individual engine operation inspection will now be described on the basis of FIG. 7, with reference to FIGS. 4 and 5.

FIG. 7 shows the follow-up of the engine speed, wherein the horizontal axis represents the passage of time, and the vertical axis represents the speed of the industrial engine 10. Ni is the idling speed of the industrial engine 10. In FIG. 7, the thin line indicates the speed specified for the industrial engine 10, and is equivalent to the operation target with which the industrial engine 10 is operated in step ST07. Also, in FIG. 7, the bold line indicates the measured speed of the industrial engine 10, and is equivalent to the operating data obtained as a result of the operation of the industrial engine 10 in accordance with the operation target in step ST08.

As shown in FIG. 7, the change in the measured value generally coincides with the change in the specified speed. Thus, when the measured value follows closely the specified speed, the evaluation in step ST09 is successful. In other words, the evaluation indicates that the control unit 63 and the industrial engine 10 shown in FIG. 4 are reliably operating in a close follow-up mode.

The description is continued with reference to FIG. 5.

ST10: After the engine performance evaluation step ST09, i.e., after the individual engine operation inspection steps ST07 through ST09 are complete, the industrial engine 10 is temporarily stopped (first engine stopping step). The process then advances to ST11 in FIG. 6.

ST11: With industrial engines 10 that have passed the individual engine operation inspection steps ST07 through ST09, the device-specific engine specification data Dm11 is automatically written into the memory 62 from the completion inspection unit 104 (composite specification data writing step) following the first engine stopping step ST10.

ST12: The communication cable 104a is removed from the industrial engine 10 (cable removal step) following the composite specification data writing step ST11. This cable removal step ST12 is executed either by the inspecting operator or automatically.

ST13: the industrial engine 10 is restarted (second engine startup step) following the cable removal step ST12.

ST14: After the second engine startup step ST13, an operation confirmation inspection is conducted on the industrial engine 10 in the case that there is a correspondence with the type M1 device. The inspection is conducted by the device-specific inspection device 105 on the basis of the device-specific engine specification data Dm11 written into the memory 62 (device-specific engine inspection step). The occurrence of operating noise, noise signals, and the like is also inspected by the device-specific inspection device 105.

ST15: The industrial engine 10 is stopped (second engine stopping step) following completion of the device-specific engine inspection step ST14.

The completion inspection is then concluded, and the process advances to the subsequent packing steps.

Thus, the combination of the steps ST04 through ST10 constitutes the individual engine inspection steps in which various inspections are conducted on the individual industrial engines 10. The combination of the steps ST13 through ST15 constitute the operation confirmation inspection steps in which an operation confirmation is conducted on the industrial engines 10 for which the device-specific engine specification data is written into the memory 62.

A summary of the above descriptions is as follows.

According to the industrial engine completion inspection apparatus 100 and the industrial engine inspection method of the present invention, identification codes 91 individually assigned to industrial engines 10 are read, (1) the basic engine specification data De1 of the industrial engine 10 to be inspected and (2) the device-specific engine specification data Dm11 based on the device on which the industrial engine 10 is mounted are automatically extracted from the database DB to the completion inspection unit 104 by using the identification code 91 as a search key, and then various inspections are automatically conducted on the individual industrial engine 10 on the basis of the basic engine specification data De1 extracted to the completion inspection unit 104, while the completion inspection unit 104 is connected with the control unit 63 of the industrial engine 10.

The data De1 and Dm11 are set in advance and can also be used as fixed inspection conditions.

Executing such a series of inspection procedures makes it possible to automatically inspect the basic performance of individual industrial engines on the basis given inspection conditions such as the basic engine specification data De1 while the completion inspection unit 104 and the control unit 63 of the industrial engine 10 are connected. Therefore, the individual industrial engines 10 can be inspected with more-improved results.

With an industrial engine 10 that has passed the individual engine operation inspection steps, after the device-specific engine specification data Dm11 is written into the memory 62 from the completion inspection unit 104, a confirmation inspection is conducted to determine whether the industrial engine 10 has the output characteristics required by the device on which it is to be mounted.

An industrial engine 10 for which the device-specific engine specification data Dm11 is written into the memory 62 can be self-controlled so as to achieve the output characteristics required by the device on which it is to be mounted. Therefore, there is no need for the inspector to make any adjustments to achieve the output characteristics required by the mounting device. The confirmation inspection can also be conducted by the completion inspection unit 104 or by a separate device-specific inspection device 105.

Thus, conducting a series of processes that include the confirmation inspection and the writing of the device-specific engine specification data Dm11 makes it possible to set the industrial engine 10 to the device-specific engine specifications, to efficiently conduct the confirmation inspection, and to improve the precision of the detection results.

Thus, in the completion inspection method of the industrial engine 10 in the present invention, the precision of the inspection results can be improved, the inspection can be conducted quickly, and inspection costs can be reduced.

Moreover, with an industrial engine 10 that has passed the individual engine inspection, there is no need to prepare the control unit 63 or the memory 62 in advance in accordance with the devices, because the device-specific engine specification data Dm11 is written into the memory 62 of the industrial engine 10 from the completion inspection unit 104. Therefore, only one type each of control unit 63 and memory 62 needs to be prepared, making it possible to reduce manufacturing costs, storage costs, and storage space.

Furthermore, in the identification code reading step ST01 in the present invention, the identification code 91 consisting of a barcode on which identification information is recorded is read by a barcode reader or other optical reading means 102 (identification code reader device 102). Information pertaining to the industrial engine 10 to be inspected can therefore be obtained in an extremely quick and reliable manner.

Furthermore, the present invention has a sensor/switch system inspection step ST04 in which the sensors and the switch systems of the industrial engine 10 are inspected following the cable connection step ST03 and prior to the individual inspection mode switching step ST05.

Thus, in the individual engine operation inspection steps (ST07 through ST09), the operation inspection of the individual engine operation inspection steps can be smoothly and reliably performed by inspecting the sensors and the switch systems of the industrial engine 10 itself in advance, before the individual engine 10 is subjected to various inspections.

In the present invention, inspections are conducted on many types of individual industrial engines 10 . . . , the output characteristics of the industrial engines 10 . . . that have passed the inspections are set in accordance with the devices on which the engines are to be mounted, and an operation confirmation is then conducted. This procedure is suitable for inspecting numerous types of industrial engines 10 . . . selectively mounted on a variety of types of devices.

Obviously, various minor changes and modifications of the present invention are possible in the light of the above teaching. It is therefore to be understood that within the scope of the appended claims the invention may be practiced otherwise than as specifically described.

What is claimed is:

1. An industrial engine completion inspection method for inspecting whether an assembled industrial engine exhibits a specific performance, said method comprising the steps of:

reading an identification code assigned to the industrial engine;

extracting basic engine specification data intrinsic to the industrial engine, as well as device-specific engine specification data based on the operating machine or other device on which the industrial engine is mounted, from a database into a completion inspection unit on the basis of the read identification code;

connecting the completion inspection unit to the industrial engine with the aid of a communication cable;

switching the operating mode of a control unit of the industrial engine to an inspection mode based on the basic engine specification data;

starting up the industrial engine;

conducting various inspections on the individual industrial engines on the basis of the basic engine specification data;

temporarily stopping the industrial engine after the inspection process is complete;

writing the device-specific engine specification data into memory in the control unit from the completion inspection unit;

removing the communication cable from the industrial engine;

restarting the industrial engine;

inspecting, on the basis of the device-specific engine specification data written into the memory, the operation confirmation of the industrial engine in the case of the devices; and stopping the industrial engine after the inspection of the operation confirmation is complete.

2. The inspection method according to claim 1, said steps for conducting various inspections on each of the industrial engines comprising:

operating the industrial engine via the control unit with a specific operation target by sending an engine operation target command signal based on the basic engine specification data from the completion inspection unit to the control unit;

sending the operating data obtained as a result of operating the industrial engine in accordance with the operation target from the control unit to the completion inspection unit; and evaluating the performance of the industrial engine by comparing the operating data with the operation target.

3. The inspection method according to claim 1, comprising:

inspecting a system composed of the sensors and the switch of the industrial engine following the step of connecting the completion inspection unit and the industrial engine.

4. The inspection method according to claim 1, wherein the identification code comprising a barcode; and the barcode being read by a barcode reader or other optical reading means when the identification code is read.

* * * * *